US010622888B1

(12) United States Patent
Paek et al.

(10) Patent No.: US 10,622,888 B1
(45) Date of Patent: Apr. 14, 2020

(54) NEGATIVE VOLTAGE CIRCUIT BASED ON CHARGE PUMP

(71) Applicant: Samsung Electro-Mechanics Co., Ltd., Suwon-si (KR)

(72) Inventors: Hyun Paek, Suwon-si (KR); Byeong Hak Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/418,020

(22) Filed: May 21, 2019

(30) Foreign Application Priority Data

Mar. 7, 2019 (KR) ........................ 10-2019-0026174

(51) Int. Cl.
*H02M 3/07* (2006.01)
*H02M 1/08* (2006.01)

(52) U.S. Cl.
CPC .............. *H02M 3/07* (2013.01); *H02M 1/08* (2013.01); *H02M 2003/071* (2013.01)

(58) Field of Classification Search
CPC .. H02M 3/07; H02M 3/073; H02M 2003/072; H02M 2003/077
See application file for complete search history.

(56) References Cited

U.S. PATENT DOCUMENTS

| 49,610,073 | * | 10/1990 | Kumanoya | ............. | G05F 3/205 323/313 |
| 5,034,625 | A * | 7/1991 | Min | ........................ | G05F 3/205 327/536 |
| 5,304,859 | A * | 4/1994 | Arimoto | ................. | G05F 3/205 327/535 |
| 5,376,840 | A * | 12/1994 | Nakayama | ............... | G05F 1/46 327/537 |
| RE35,141 | E * | 1/1996 | Ozaki | ..................... | G05F 3/205 327/536 |
| 5,929,693 | A * | 7/1999 | Kuroda | ............... | H01L 27/0222 327/535 |
| 6,275,096 | B1* | 8/2001 | Hsu | ......................... | H02M 3/07 327/534 |
| 6,278,317 | B1* | 8/2001 | Hsu | ...................... | H02M 3/073 327/536 |
| 6,414,881 | B1* | 7/2002 | Fujii | ..................... | G11C 5/145 327/534 |
| 6,519,191 | B1* | 2/2003 | Morishita | ................ | G11C 5/14 365/189.09 |

(Continued)

FOREIGN PATENT DOCUMENTS

JP 2002-84739 A 3/2002
JP 2003-45193 A 2/2003

*Primary Examiner* — Thomas J. Hiltunen
(74) *Attorney, Agent, or Firm* — NSIP Law

(57) ABSTRACT

A negative voltage circuit includes a first charge pump circuit and a second charge pump circuit. The first charge pump circuit is configured to operate in a start-up mode and perform a first charge pumping operation based on a first current to generate a negative voltage. The second charge pump circuit is configured to operate in a normal operating mode subsequent to the start-up mode and perform a second charge pumping operation based on a second current to generate a negative voltage, The first current is higher than the second current, and a speed of the first charge pumping operation is higher than a speed of the second charge pumping operation.

18 Claims, 9 Drawing Sheets

(56) References Cited

U.S. PATENT DOCUMENTS

| | | | | |
|---|---|---|---|---|
| 6,657,876 B2* | 12/2003 | Satoh | ............... | H02J 7/0065 |
| | | | | 307/110 |
| 6,876,247 B2* | 4/2005 | Jang | ............... | H02M 3/073 |
| | | | | 327/536 |
| 7,245,176 B2* | 7/2007 | Do | ............... | G11C 29/028 |
| | | | | 327/536 |
| 7,733,162 B2* | 6/2010 | Kim | ............... | G11C 5/145 |
| | | | | 327/536 |
| 9,973,080 B2* | 5/2018 | Teh | ............... | H02M 3/07 |
| 2002/0030534 A1 | 3/2002 | Myomo | | |
| 2002/0171470 A1* | 11/2002 | Sim | ............... | G11C 5/147 |
| | | | | 327/536 |
| 2003/0057469 A1 | 3/2003 | Karaki | | |

\* cited by examiner

NEGATIVE VOLTAGE CIRCUIT BASED ON CHARGE PUMP

CROSS-REFERENCE TO RELATED APPLICATION

This application claims the benefit under 35 USC 119(a) of Korean Patent Application No. 10-2019-0026174 filed on Mar. 7, 2019, in the Korean Intellectual Property Office, the entire disclosure of which is incorporated herein by reference for all purposes.

BACKGROUND

1. Field

The following disclosure relates to a negative voltage circuit based on a charge pump.

2. Description of Related Art

In general, a radio-frequency (RF) switch device requires a negative voltage to improve isolation characteristics, which may be generated by a negative voltage circuit. As an example, the negative voltage circuit may use a negative charge pump.

A negative voltage charge pump may typically include an inverter and a charging capacitor. In the negative voltage charge pump, the time required to reach a target voltage and the magnitude of a loading current may be determined by a size of the inverter and a size of the charging capacitor.

As an example, the larger the size of the inverter, the more current that may be allowed to flow. The higher the capacitance of the charging capacitor, the more charge that may be controlled. For these reasons, a target voltage may be reached more rapidly, and high currents may be loaded by enlarging the capacitance of the charging capacitor and the size of the inverter.

In the negative voltage charge pump according to the related art, more current loading is required when the charge pump first operates and when input power is high; otherwise, more current loading is not required.

However, when the negative voltage charge pump is typically set to appropriate more current loading in the early stage, a considerable amount of power may be consumed during the operation of the charge pump. When the negative voltage charge pump is set to appropriate less current loading during normal operation, initial loading time may increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a negative voltage circuit includes a first charge pump circuit and a second charge pump circuit. The first charge pump circuit is configured to operate in a start-up mode and perform a first charge pumping operation based on a first current to generate a negative voltage. The second charge pump circuit is configured to operate in a normal operating mode subsequent to the start-up mode and perform a second charge pumping operation based on a second current to generate a negative voltage, The first current is higher than the second current, and a speed of the first charge pumping operation is higher than a speed of the second charge pumping operation.

The negative voltage circuit may further include a power switch circuit and a signal switch circuit. The power switch circuit may be configured to selectively connect one of a first power terminal, connected to the first charge pump circuit, and a second power terminal, connected to the second charge pump circuit, and a terminal of a first power supply voltage to each other. The signal switch circuit may be configured to selectively connect one of a first signal terminal, connected to the first charge pump circuit, and a second signal terminal, connected to the second charge pump circuit, and a driving signal terminal to each other.

The first charge pump circuit may include a first inverter circuit, a first output switch circuit, and a first output capacitor. The first inverter circuit may be configured to perform a first charging operation and a first discharging operation based on the first current in response to a driving signal input through the signal switch circuit. The first output switch circuit may be configured to selectively connect a first capacitor node of the first inverter circuit to one of a second operating voltage terminal and a first output node of the first charge pump circuit in response to the driving signal input. The first output capacitor may be connected between a first output node of the first charge pump circuit and a ground to stabilize a negative voltage at the first output node of the first charge pump circuit.

The second charge pump circuit may include a second inverter circuit, a second output switch circuit, and a second output capacitor circuit. The second inverter circuit may be configured to perform a second charging operation and a second discharging operation based on the second current in response to a driving signal input through the signal switch circuit. The second output switch circuit may be configured to selectively connect a second capacitor node of the second inverter circuit to one of a second operating voltage terminal and a second output node of the second charge pump circuit in response to the driving signal. The second output capacitor circuit may be connected between a second output node of the second charge pump circuit and a ground to stabilize a negative voltage at the second output node of the second charge pump circuit.

The first inverter circuit may include a first upper switch element, a first lower switch element, and a first charge capacitor. The first upper switch element may be connected between a first power terminal and a first middle node of the power switch circuit and configured to perform a switching operation in response to the driving signal. The first lower switch element may be connected between the first middle node and a terminal of a second power supply voltage and configured to perform a switching operation complementary to the first upper switch element in response to the driving signal. The first charge capacitor may be connected between the first middle node and the first capacitor node and configured to perform the first charging operation upon the first upper switch element being in an ON state and perform the first discharging operation upon the first lower switch element being in an ON state. The second inverter circuit may include a second upper switch circuit, a second lower switch element, and a second charge capacitor. The second upper switch circuit may be connected between a second power terminal of the power switch circuit and a second middle node and configured to perform a switching operation in response to the driving signal. The second lower switch element may be connected between the second middle node and a terminal of a second power supply voltage and configured to perform a switching operation complementary to the second upper switch element in response to the driving signal. The second charge capacitor may be connected between the second middle node and a second capacitor node and configured to perform the second charging operation upon the second upper switch element being in an ON state and perform the second discharging operation upon the second lower switch element being in an ON state. The first upper switch element may have a size larger than a size of the second upper switch element. The first lower switch element may have a size larger than a size of the second lower switch element.

The first output switch circuit may include a first ground switch and a first output switch. The first ground switch may be connected between the first capacitor node and a terminal of the second operating voltage to enter an ON state during the first charging operation. The first output switch may be connected between the first capacitor node and the output node to enter an ON state during the first discharging operation. The second output switch circuit may include a second ground switch and a second output switch. The second ground switch may be connected between the second capacitor node and the terminal of the second operating voltage to enter an ON state during the second discharging operation. The second output switch may be connected between the second capacitor node and the output node to enter an ON state during the second discharging operation.

The first output capacitor circuit may include a first load capacitor connected between the first output node and a ground to stabilize a negative voltage at the first output node. The second output capacitor circuit may include a second load capacitor connected between the second output node and a ground to stabilize a negative voltage at the second output node.

Each of the first and second upper switch elements and the first and second ground switches may be a PMOS transistor. Each of the first and second lower switch elements and the first and second output switches may be an NMOS transistor.

In another general aspect, a negative voltage circuit includes a first charge pump circuit, a second charge pump circuit, and an operating mode control circuit. The first charge pump circuit is configured to operate in a start-up mode and perform a first charge pumping operation based on a first current to generate a negative voltage. The second charge pump circuit is configured to operate in a normal operating mode subsequent to the start-up mode and perform a second charge pumping operation based on a second current to generate a negative voltage. The operating mode control circuit is configured to control switching from the start-up mode, in which the first charge pump circuit operates, to the normal operating mode, in which the second charge pump circuit operates, based on a negative voltage at an output terminal. The first current is higher than the second current, and a speed of the first charge pumping operation is higher than a speed of the second charge pumping operation.

The negative voltage circuit may further include a power switch circuit, a signal switch circuit, and an output circuit. The power switch circuit may be configured to selectively connect one of a first power terminal, connected to the first charge pump circuit, and a second power terminal, connected to the second charge pump circuit, and a terminal of the first power supply voltage to each other under control of the operating mode control circuit. The signal switch circuit may be configured to selectively connect one of a first signal terminal, connected to the first charge pump circuit, and a second signal terminal, connected to the second charge pump circuit, and a driving signal terminal to each other under control of the operating mode control circuit. The output circuit may be configured to transfer a negative voltage from the first charge to an output terminal and to transfer a negative voltage from the second charge pump circuit to an output terminal.

The first charge pump circuit may include a first inverter, a first output switch circuit, and a first output capacitor. The first inverter circuit may be configured to perform a first charging operation and a first discharging operation based on the first current in response to a driving signal input through the signal switch circuit. The first output switch circuit may be configured to selectively connect a first capacitor node of the first inverter circuit to one of a second operating voltage terminal and a first output node of the first charge pump circuit. The first output capacitor may be connected between a first output node of the first charge pump circuit and a ground to stabilize a negative voltage at the first output node of the first charge pump circuit.

The second charge pump circuit may include a second inverter circuit, a second output switch circuit, and a second output capacitor circuit. The second inverter circuit may be configured to perform a second charging operation and a second discharging operation based on the second current in response to a driving signal input through the signal switch circuit. The second output switch circuit may be configured to selectively connect a second capacitor node of the second inverter circuit to one of a second operating voltage terminal and a second output node of the second charge pump circuit in response to the driving signal. The second output capacitor circuit may be connected between a second output node of the second charge pump circuit and a ground to stabilize a negative voltage at the second output node of the second charge pump circuit.

The first inverter circuit may include a first upper switch element, a first lower switch element, and a first charge capacitor. The first upper switch element may be connected between a first power terminal and a first middle node of the power switch circuit and configured to perform a switching operation in response to the driving signal. The first lower switch element may be connected between the first middle node and a terminal of a second power supply voltage and configured to perform a switching operation complementary to the first upper switch element in response to the driving signal. The first charge capacitor may be connected between the first middle node and the first capacitor node and configured to perform the first charging operation upon the first upper switch element is in an ON state and perform the first discharging operation upon the first lower switch element is in an ON state. The second inverter circuit may include a second upper switch circuit, a second lower switch element, and a second charge capacitor. The second upper switch circuit may be connected between a second power terminal of the power switch circuit and a second middle node and configured to perform a switching operation in response to the driving signal. The second lower switch element may be connected between the second middle node and a terminal of a second power supply voltage and configured to perform a switching operation complementary to the second upper switch element in response to the driving signal. The second charge capacitor may be connected between the second middle node and a second capacitor node and configured to perform the second charging operation upon the second upper switch element being in an ON state and perform the second discharging operation upon the second lower switch element being in an ON state. The first upper switch element may have a size larger than a size of the second upper switch element. The first lower switch element may have a size larger than a size of the second lower switch element.

The first output switch circuit may include a first ground switch and a first output switch. The first ground switch may be connected between the first capacitor node and a terminal of the second operating voltage to enter an ON state during the first charging operation. The first output switch may be connected between the first capacitor node and the output node to enter an ON state during the first discharging operation. The second output switch circuit may include a second ground switch and a second output switch. The second ground switch may be connected between the second capacitor node and the terminal of the second operating voltage to enter an ON state during the second discharging operation. The second output switch may be connected between the second capacitor node and the output node to enter an ON state during the second discharging operation.

The first output switch circuit may include a first ground switch and a first output switch. The first ground switch may be connected between the first capacitor node and a terminal of the second operating voltage to enter an ON state during the first charging operation.

The first output switch may be connected between the first capacitor node and the output node to enter an ON state during the first discharging operation. The second output switch circuit may include a second ground switch and a second output switch. The second ground switch may be connected between the second capacitor node and the terminal of the second operating voltage to enter an ON state during the second discharging operation. The second output switch may be connected between the second capacitor node and the output node to enter an ON state during the second discharging operation.

The operating mode control circuit may include a comparison circuit configured to generate a control signal for controlling switching from the start-up mode to the normal operating mode, The control signal may transition from a low level to a high level upon the negative voltage being higher than or equal to the first reference voltage, and transition from a high level to a low level upon the negative voltage being lower than or equal to a second reference voltage.

In another general aspect, a negative voltage circuit includes a first charge pump circuit and a second charge pump circuit. The first charge pump circuit operates in a start-up mode to perform a first charge pumping operation based on a first current to generate a negative voltage to an output circuit; and a second charge pump circuit. The second charge pump circuit operates in a normal operating mode subsequent to the start-up mode to perform a second charge pumping operation based on a second current to generate a negative voltage to the output circuit. The first current is higher than the second current, and a speed of the first charge pumping operation is higher than a speed of the second charge pumping operation.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
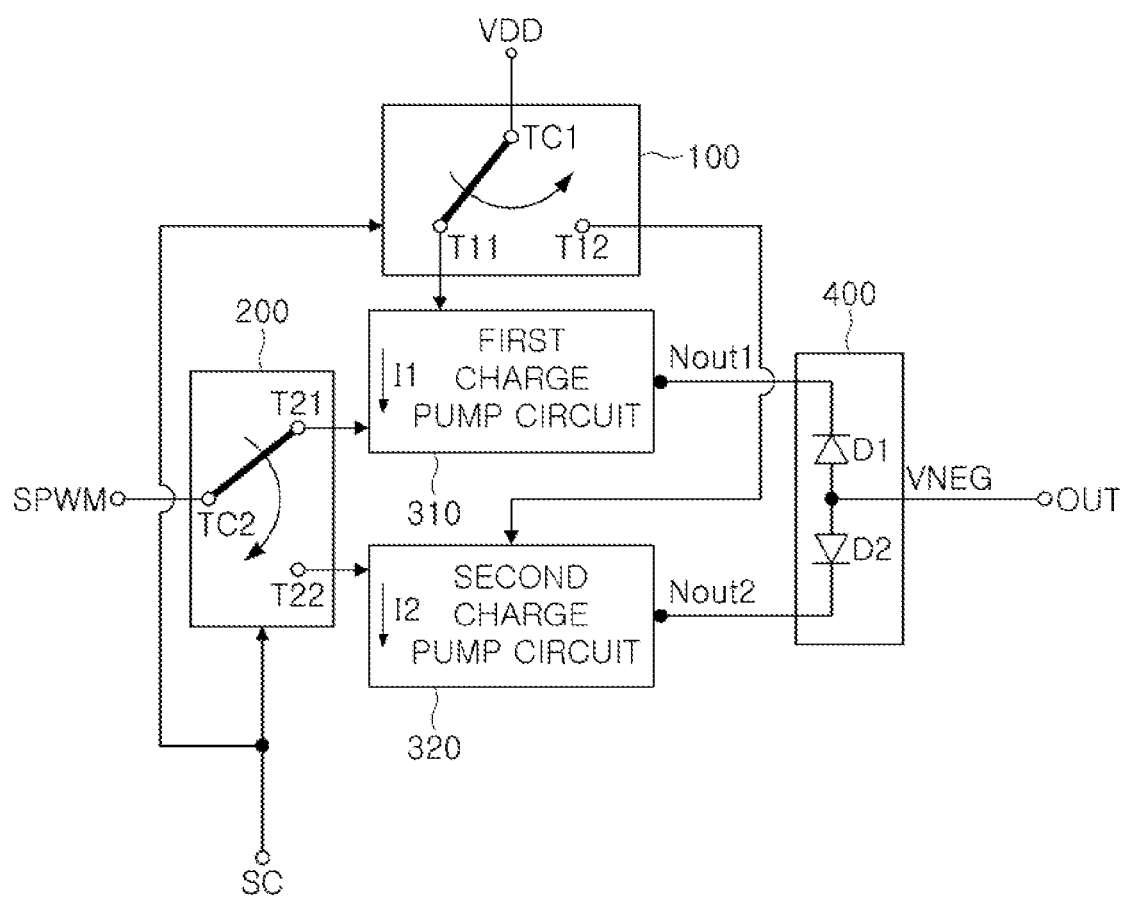
FIG. 1 illustrates an example of a negative voltage circuit.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
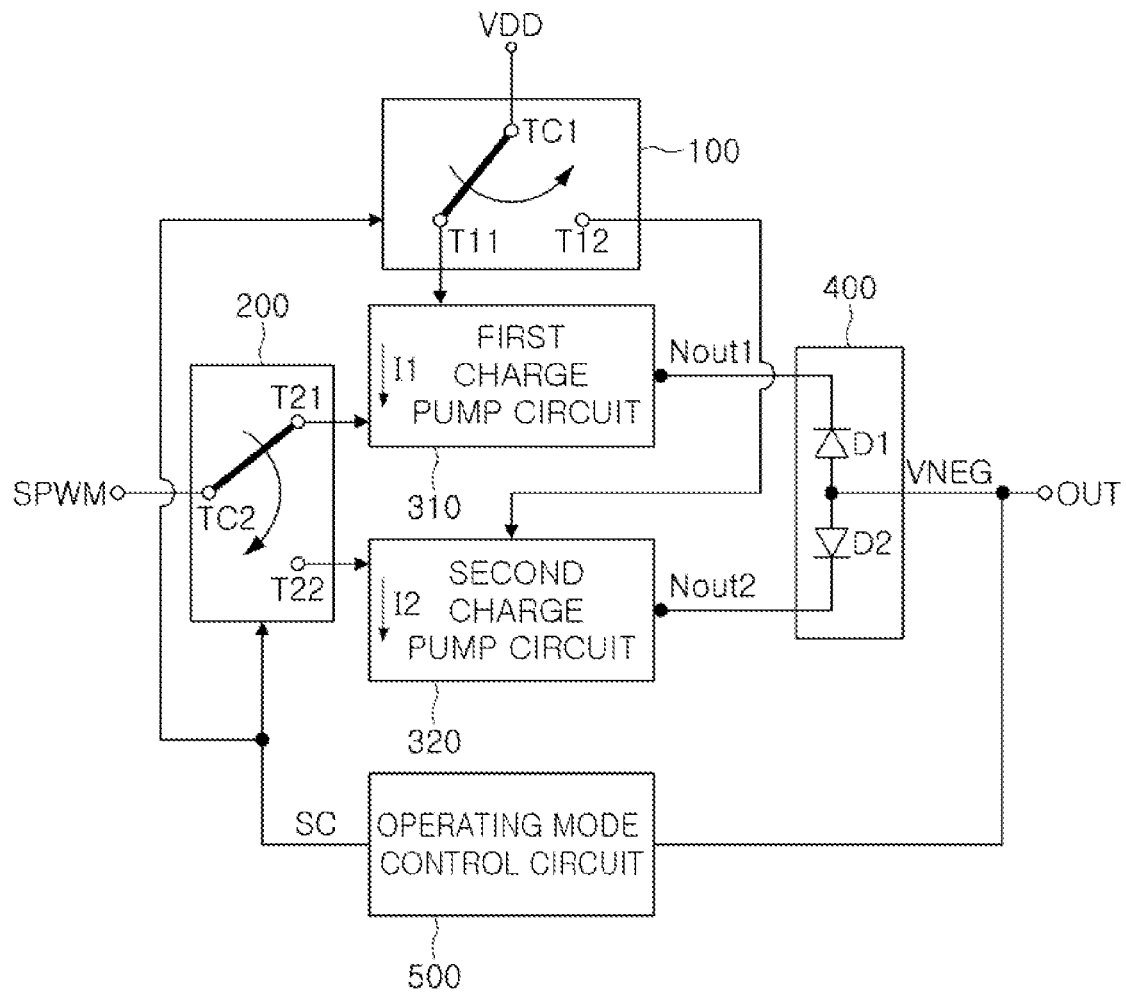
FIG. 2 illustrates an example of a negative voltage circuit.

FIG. 1 illustrates an example of a negative voltage circuit and FIG. 2 illustrates an example of a negative voltage circuit.

Referring to FIGS. 1 and 2, a negative voltage circuit according to an example may include a first charge pump circuit 310 and a second charge pump circuit 320.

The first charge pump circuit 310 may operate during a start-up mode and may perform first charge pumping using a first current I1 to generate a negative voltage.

The second charge pump circuit 320 may operate during a normal operating mode following the start-up mode and may perform second charge pumping using a second current I2, different from the first current I1, to generate a negative voltage.

The first current I1 may be a current higher than the second current I2 in such a manner that the first charge pumping speed of the first charge pump circuit 310 is higher than second charge pumping speed of the second charge pump circuit 320. As an example, when the first current I1 is higher than the second current I2, charging and discharging may be performed at a higher speed in the start-up mode.

The negative voltage circuit may further include a power switch 100, a signal switch circuit 200, and an output circuit 400.

The power switch circuit 100 may connect one of a first power terminal T11, connected to the first charge pump circuit 310, and a second power terminal T12, connected to the second charge pump circuit 320, and a terminal TC1 of a first power supply voltage VDD to each other.

As an example, in the start-up mode, the power switch circuit 100 may connect the terminal TC1 of the first power supply voltage VDD to the first power terminal T11 to supply the power supply voltage VDD to the first charge pump circuit 310. As an example, in the normal operating mode, the power switch circuit 100 may connect the terminal TC1 of the first power supply voltage to the second power terminal T12 to supply the first power supply voltage VDD to the second charge pump circuit 320.

The signal switch circuit 200 may connect one of a first signal terminal T21, connected to the first charge pump circuit 310, and a second signal terminal T22, connected to the second charge pump circuit 320, and a driving signal (SPWM) terminal TC2 to each other. For example, a driving signal SPWM may be any one of a pulse signal, a PWM signal, and an oscillation signal in which a high level and a low level are repeated. Hereinafter, for ease of description, a PWM signal will be described as the driving signal SPWM.

As an example, in the start-up mode, the signal switch circuit 200 may connect the driving signal (SPWM) terminal TC2 to the first signal terminal T21 to provide the driving signal SPWM to the first charge pump circuit 310. As an example, in the normal operating mode, the signal switch circuit 200 may connect the driving signal (SPWM) terminal to the second signal terminal T22 to provide the driving signal SPWM to the second charge pump circuit 320.

The output circuit 400 may transmit a negative voltage from the first charge pump circuit 310 to an output terminal OUT, and may transmit a negative voltage from the second charge pump circuit 320 to the output terminal OUT.

As an example, the output circuit 400 may include a first diode D1 and a second diode D2.

The first diode D1 may include a cathode terminal, connected to a first output node Nout1 of the first charge pump circuit 310, and an anode terminal connected to the output terminal OUT. Accordingly, the first diode D1 may transmit the negative voltage from the charge pump circuit 310 to the output terminal OUT.

The second diode D2 may include a cathode terminal, connected to a second output node Nout2 of the second charge pump circuit 320, and an anode terminal connected to the output terminal OUT. Accordingly, the second diode D2 may transmit the negative voltage from the second charge pump circuit 320 to the output terminal OUT.

In an example, the first charge pump circuit 310 may be a relatively high-powered and high-speed charge pump circuit using a relatively large first current, and the second charge pump circuit 320 may be a relatively low-powered and low-speed charge pump circuit using a second current, smaller than the first current.

Throughout the drawings and the detailed description, the same reference numerals refer to the same elements. The drawings may not be to scale, and the relative size, proportions, and depiction of elements in the drawings may be exaggerated for clarity, illustration, and convenience.

Referring to FIG. 2, the negative voltage circuit may further include an operating mode control circuit 500.

The operating mode control circuit 500 may generate a control signal SC based on a negative voltage VNEG at an output terminal OUT and may control switching from a start-up mode, in which the first charge pump circuit 310 operates, to a normal operating mode, in which the second charge pump circuit 310 operates, by using the control signal SC.

As an example, in the case in which the negative voltage VNET of the output terminal OUT is higher than a reference voltage, the operating mode control signal 500 may generate a control signal SC having a voltage level (for example, a low level) for maintaining the start-up mode, set to a default mode, when an initial operation is started. Then, the operating mode control circuit 500 may output the control signal to the power switch circuit 100 and the signal switch circuit 200.

In the case in which the negative voltage at the output terminal OUT is lower than the reference voltage, the operating mode control circuit 500 may generate a control signal SC having a voltage level (for example, a high level) for a mode switch from the start-up mode to the normal operating mode. Then, the operating mode control circuit 500 may output the control signal SC to the power switch circuit 100 and the signal switch circuit 200.

For example, the control signal SC may have a voltage level for maintaining a start-up mode and may have a high voltage level for a mode switch from the start-up mode to a normal operating mode and vice versa.

Figure 3:
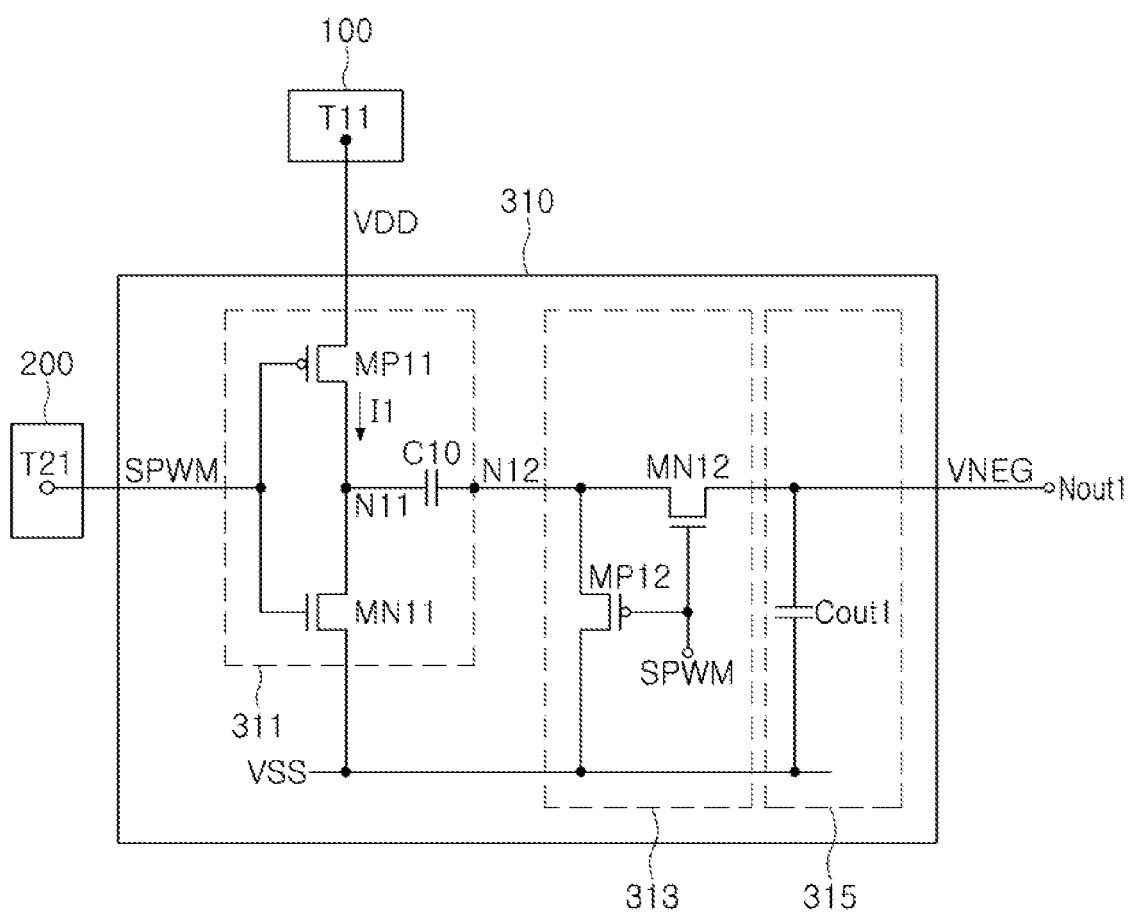
FIG. 3 illustrates an example of a first charge pump circuit.

FIG. 3 illustrates an example of a first charge pump circuit.

Referring to FIG. 3, the first charge pump circuit 310 may include a first inverter circuit 311, a first output switch circuit 313, and a first output capacitor circuit 315.

The first inverter circuit 311 may perform a first charging operation and a first discharging operation using the first current I1 based on a driving signal SPWM input through the signal switch circuit 200.

The first output switch circuit 313 may selectively connect a first capacitor node N12 of the first inverter circuit 311 to one of a second operating voltage (VSS) terminal and a first output node Nout1 of the first charge pump circuit 310.

The first output capacitor circuit 315 may be connected between the output of the first charge pump circuit 310 and a ground to stabilize a negative voltage at the first output voltage Nout of the first charge pump circuit 310.

As an example, the first inverter circuit 311 may include a first upper switch element MP11, a first lower switch element MN11, a first charge capacitor C10.

The first upper switch element MP11 is connected between a first power terminal T11 of the power switch 100 and a first middle node N11, and may perform a switching operation (an ON state or an OFF state) based on the driving signal SPWM.

The lower switch element MN11 may be connected between the first middle node N11 and a terminal of the second power supply voltage VSS, and may perform a switching operation (an ON state or an OFF state) complementary to the first upper switch element MP11.

The first charge capacitor C10 may be connected between the first middle node N11 and the first capacitor node N12.

The first output switch circuit 313 may include a first ground switch MP12 and a first output switch MN12.

The first ground switch MP12 may be connected between the first capacitor node N12 and a terminal of the second operating voltage VSS to enter an ON state during the first charging operation.

The first output switch MN12 may be connected between the first capacitor node N12 and the output node Nout to enter an ON state during the first discharging operation.

For example, the first charging operation may be performed when the first upper switch element MP11 and a first ground switch MP12 are in an ON state, and the first discharging operation may be performed when the first lower switch element MN11 and the second output switch MN12 are in an ON state.

The first output capacitor circuit 315 may include a first load capacitor Cout1. The first load capacitor Cout1 may be connected between the first output node Nout1 and a ground to stabilize a negative voltage at the first output node Nout1.

Figure 4:
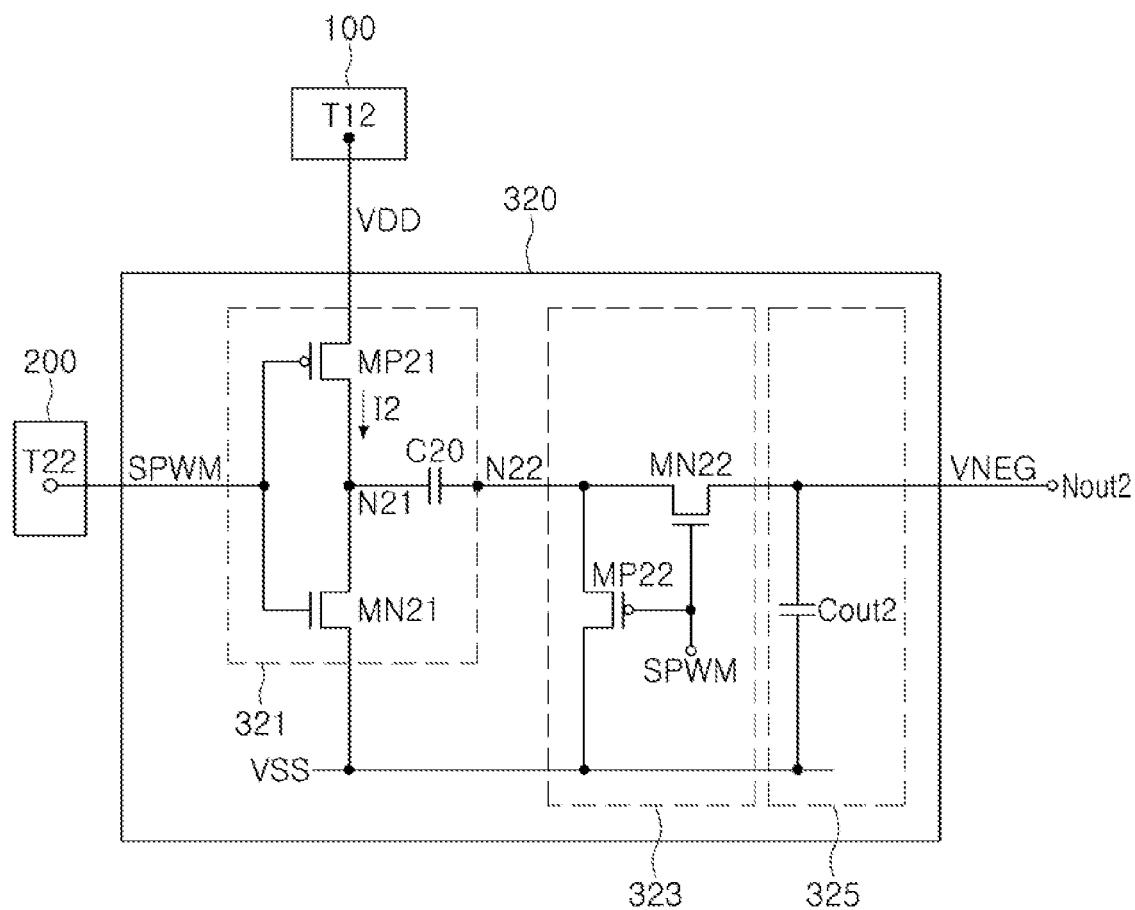
FIG. 4 illustrates an example of a second charge pump circuit.

FIG. 4 illustrates an example of a second charge pump circuit.

Referring to FIG. 4, the second charge pump circuit 320 may include a second inverter circuit 321, a second output switch circuit 323, and a second output capacitor 325.

The second inverter circuit 321 may perform a second charging operation and a second discharging operation using the second current I2 based on a driving signal SPWM input through the signal switch circuit 200.

The second output switch circuit 323 may selectively connect a second capacitor node N22 of the second inverter circuit 321 to one of a second operation voltage (VSS) terminal and a second output node Nout2 of the second charge pump circuit 320 based on the driving signal SPWM.

The second output capacitor circuit 325 may be connected between the second output node Nout2 of the second charge pump circuit 320 and a ground to stabilize a negative voltage at the second output voltage Nout2 of the second charge pump circuit 320.

As an example, the second inverter circuit 321 may include a second upper switch element MP21, a second lower switch element MN21, and a second charge capacitor C20.

The second upper switch element MP22 may be connected between a second power terminal T12 of the power switch circuit 100 and a second middle node N21, and may perform a switching operation based on the driving signal SPWM.

The second lower switch element MN21 may be connected between the second middle node N21 and a terminal of a second power supply voltage VSS, and may perform a switching operation complementary to the second upper switch element MP21 based on the driving signal SPWM.

The second charge capacitor C20 may be connected between the second middle node N21 and the second capacitor node N22.

Referring to FIGS. 3 and 4, the first upper switch element MP11, operating in a start-up mode, may have a size larger than a size of the second upper switch element MP21 operating in a normal operating mode. The first lower switch element MN1, operating in the start-up mode, may have a size larger than a size of the second lower switch element MN21 operating in the normal operating mode.

The second switch circuit 323 may include a second ground switch MP22 and a second output switch MN22.

The second ground switch MP22 may be connected between the second capacitor node N22 and a terminal of the second operating voltage VSS to enter an ON state during the second charging operation.

The second output switch MN22 may be connected between the second capacitor node N22 and the output node Nout to enter an ON state during the second charging operation.

For example, the second charging operation may be performed when the second upper switch element MP21 and the second ground switch MP22 are in an ON state, and the second discharging operation may be performed when the second lower switch element MN21 and the second output switch MN22 are in an ON state.

The second output capacitor circuit 325 may include a second load capacitor Cout2. The second load capacitor Cout2 may be connected between the second output node Nout2 and a ground to stabilize a negative voltage at the second output node Nout2.

In FIGS. 3 and 4, for example, each of the first and second upper switch elements MP11 and MP21 and the first and second ground switches MP12 and MP22 may be a PMOS transistor, and each of the first and second lower switch elements MN11 and MN21 and the first and second output switches MN12 and MN22 may be an NMOS transistor.

As another example, each of the first and second output switches MN12 and MN22 and the first and second ground switches MP12 and MP22 may include a diode rather than a MOS transistor.

Figure 5:
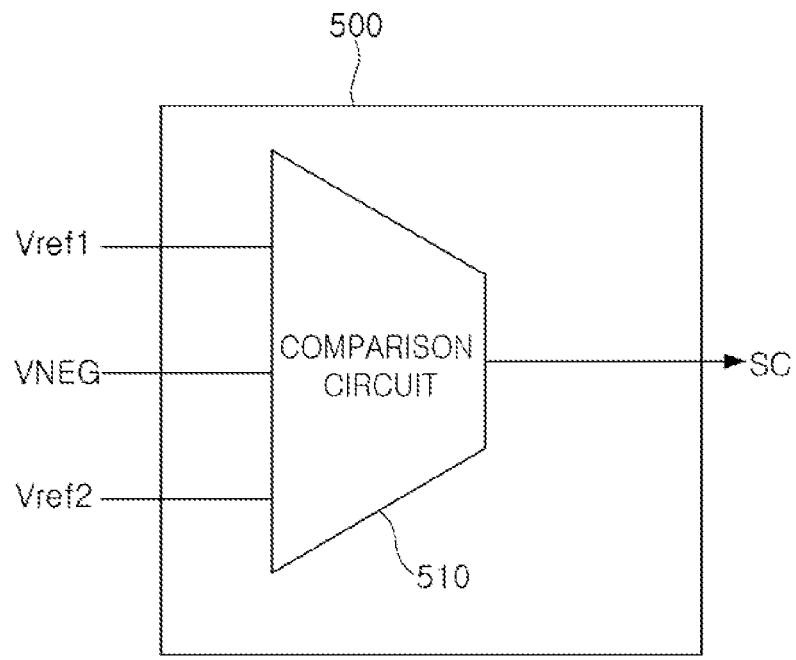
FIG. 5 illustrates an example of an operating mode control circuit.
Figure 6:
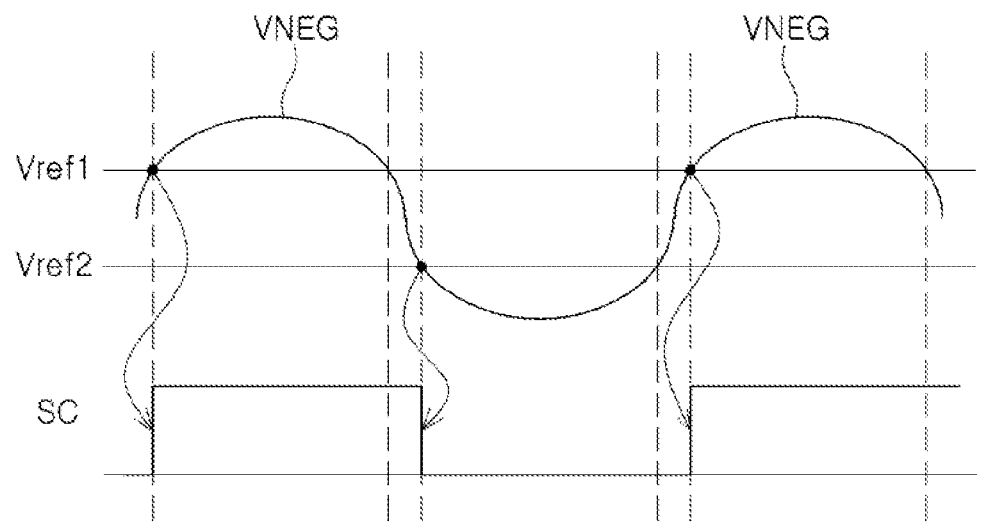
FIG. 6 is an example of a timing diagram of a control signal of an operating mode control circuit in FIG. 5.

FIG. 5 illustrates an example of an operating mode control circuit, and FIG. 6 is an example of a timing diagram of a control signal of an operating mode control circuit in FIG. 5.

Referring to FIGS. 5 and 6, as an example, the operating mode control circuit 500 may include a comparison circuit 510.

The comparison circuit 510 may output a control signal, transitioning from a low level to a high level, to control switching from the start-up mode to the normal operating mode when the negative voltage is higher than the first reference voltage Vref1. Alternatively, the comparison circuit 510 may output a control signal, transitioning from a high level to a low level, when the negative voltage is lower than or equal to the second reference voltage Vref2. For example, the first reference voltage Vref1 may be a voltage higher than the second reference voltage Vref2.

As an example, a low-to-high transition of the first control signal SC1 is based on the first reference voltage Vref1, and a high-to-low transition of the first control signal SC1 is based on the second reference signal Vref2. Thus, the comparison circuit 251 may serve as a hysteresis comparator.

Figure 7:
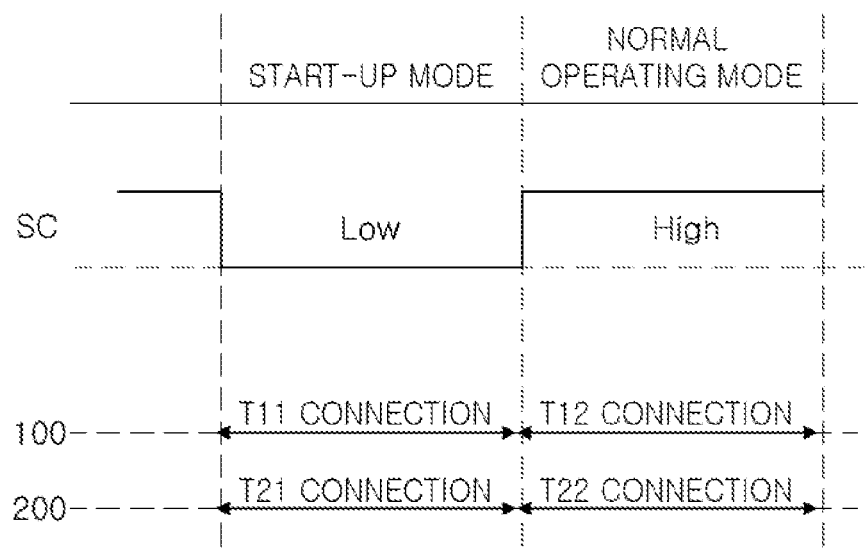
FIG. 7 is an example of an illustrative diagram of a start-up mode and a normal operating mode.

FIG. 7 is an example of an illustrative diagram of a start-up mode and a normal operating mode.

Referring to FIG. 7, in an example, a negative voltage circuit may perform a start-up mode at the time of initial driving, and then may perform a normal operating mode.

Referring to FIGS. 6 and 7, the start-up mode is performed when a negative voltage VNEG is lower than the first reference voltage Vref1, and the normal operating mode is performed when the negative voltage VNEG is higher than the first reference voltage Vref1.

Figure 8:
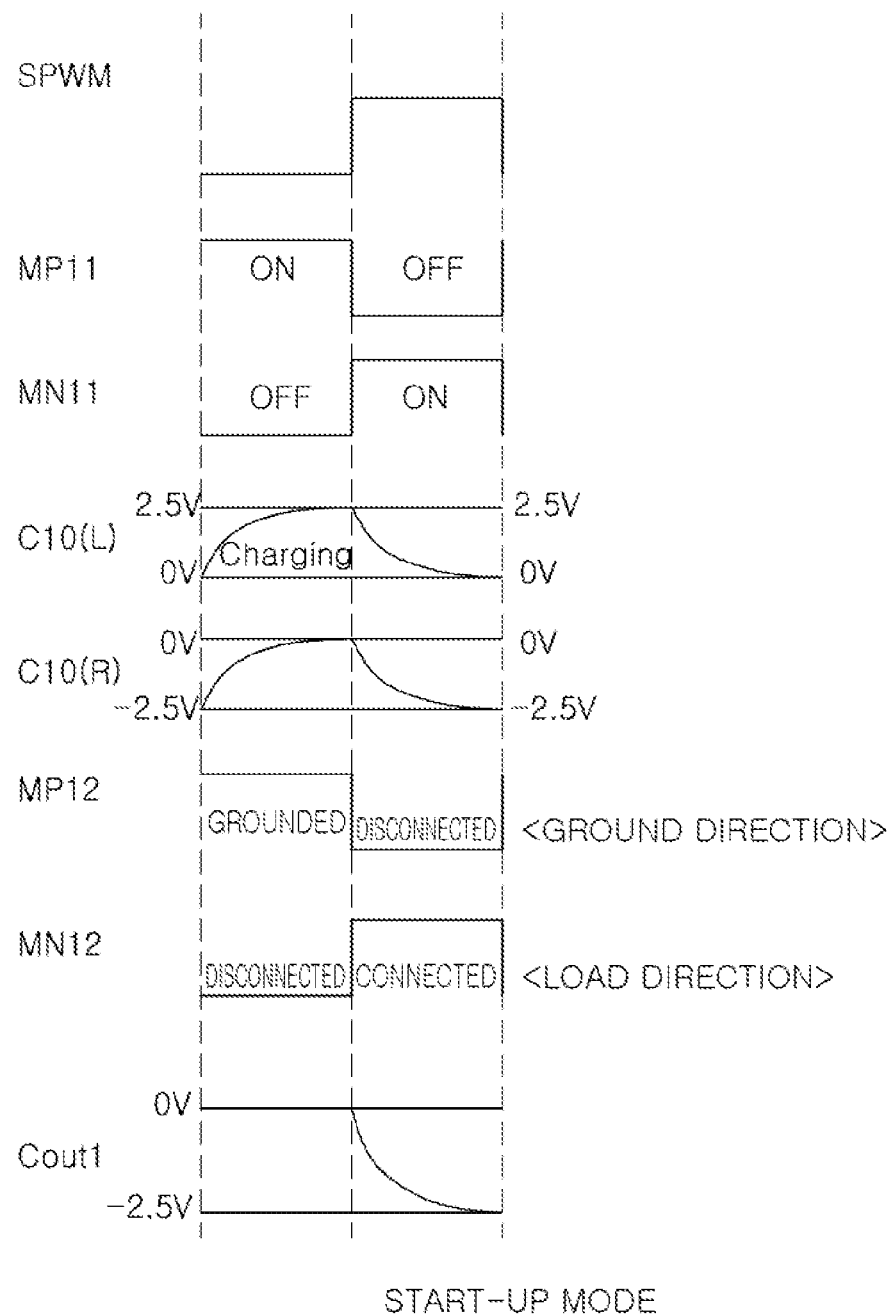
FIG. 8 is an example of an operational timing diagram of a negative voltage circuit for the start-up mode of FIG. 7.
Figure 9:
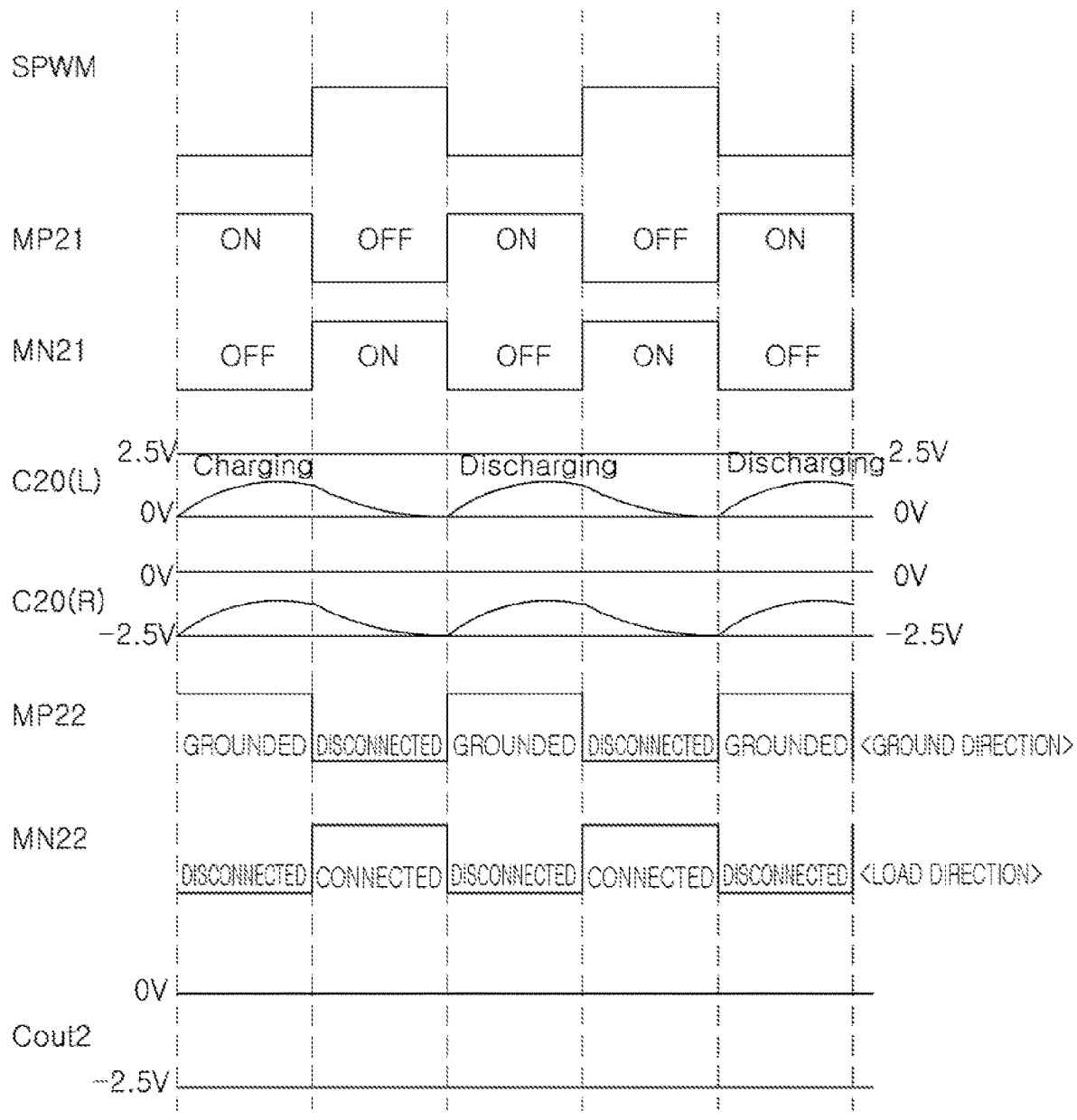
FIG. 9 is an example of an operational timing diagram of a negative voltage circuit for the normal operating mode of FIG. 7.

FIG. 8 is an example of an operational timing diagram of a negative voltage circuit for the start-up mode of FIG. 7, and FIG. 9 is an example of an operational timing diagram of a negative voltage circuit for the normal operating mode of FIG. 7.

Hereinafter, the operation of the negative voltage circuit for the start-up mode will be described with reference to FIGS. 7 and 8.

As an example, the driving signal SPWM may be a square wave in which a high level and a low level are repeated. The first upper switch element MP11 and the first lower switch element MN11 may repeatedly enter an ON state and an OFF state based on the driving signal SPWM.

As an example, a left voltage C10(L) of the first charge capacitor C10 (a voltage at a middle node Nm) may rise from zero volts (0 V) to 2.5 V during a charging operation and may fall from 1.5 V to 0 V during a discharging operation. As an example, charging from 0 V to +2.5 V may be performed for a short period of time by the first current 11, a relatively high current.

As an example, a right voltage C10(R) of the first charge capacitor C10 (a voltage at an output node No) may rise from −2.5 V to 0 V during a charging operation, and may fall from 0 V to −2.5 V during a discharging operation. As an example, discharging from +2.5 V to 0 V may be performed for a short period of time by a third current 13, a relatively high current.

According to a PWM signal SPWM, the first output switch MN12 may enter an OFF state (a disconnected state) during a WP1 charging operation and may enter an ON state (a connected state) during a WP1 discharging operation. According to the PWM signal SPWM, the first ground switch MP12 may enter an ON state (a grounded state) during the first charging operation and may enter an OFF state (a disconnected state) during the first discharging operation.

According to the PWM signal SPWM, the first output switch MN12 may enter an OFF state (a disconnected) state during the WP1 charging operation and may enter an ON state (a connected state) during the WP1 discharging operation. According to the first ground switch MP12, the first ground switch MP12 may enter an ON state (a grounded state) during the first charging operation and may enter the OFF state (a disconnected state) during the first charging operation.

As a result, a voltage of the first load capacitor Cout1 may be rapidly switched from 0 V to a negative voltage of −2.5 V.

The operation of the negative voltage circuit for the normal operating mode with reference to FIG. 9 is the same as the description of the operation with reference to FIG. 8, except for a difference below.

A difference between FIG. 8 and FIG. 9 will now be described. A rising speed of each of the left voltage C10(L) and the right voltage C10(R) of the first charge capacitor C10 in a start-up mode is higher (for example, twice higher) than a rising speed of each of the left voltage C20(L) and the right voltage C20(R) of the second charging capacitor C20 in a normal operating mode.

In addition, a falling speed of each of the left voltage C10(L) and the right voltage C10(R) of the first charge capacitor C10 in the start-up mode is higher (for example, twice higher) than a falling speed of each of the left voltage C20(L) and the right voltage C20(R) of the second charging capacitor C20 in the normal operating mode.

Accordingly, a voltage at an output terminal may reach a negative voltage more rapidly in the start-up mode, and then the normal operating mode may be performed to allow the negative voltage to be maintained.

Figure 10:
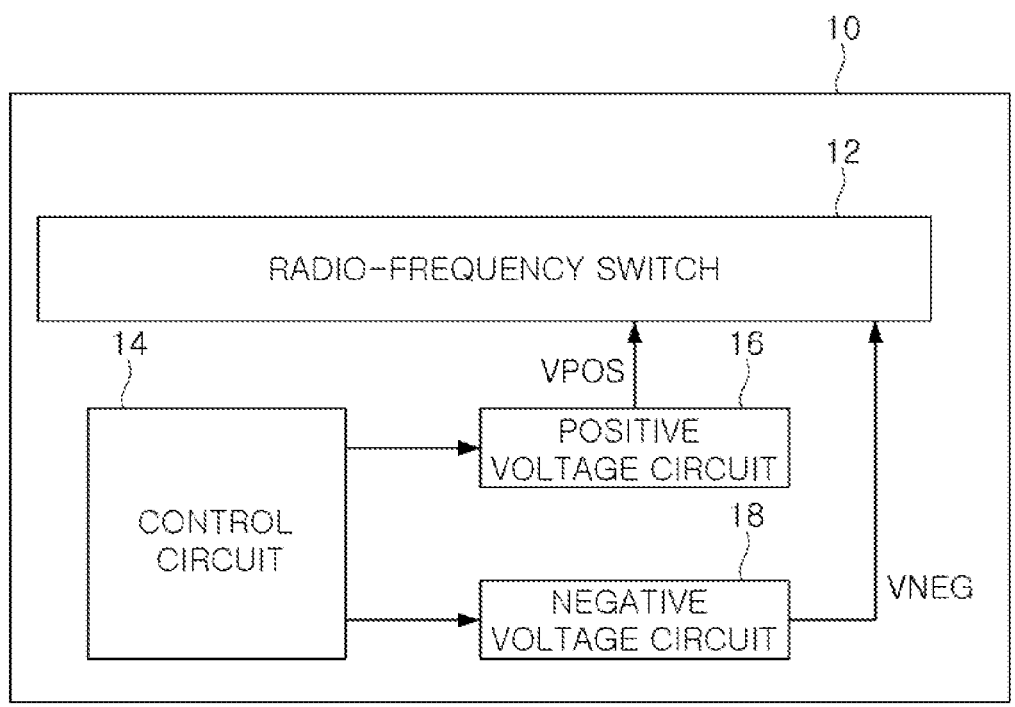
FIG. 10 is an example of an illustrative diagram of an application of a negative voltage circuit.

FIG. 10 is an example of an illustrative diagram of an application of a negative voltage circuit.

Referring to FIG. 10, in an example, a negative voltage 200 may be applied to a high-frequency switch device 10.

The radio-frequency switch device 10 may include a radio-frequency circuit 12 configured to switch a radio-frequency signal, a control circuit 14 configured to control supply of a positive voltage VPOS and a negative voltage VNEG, a positive voltage circuit 16 configured to generate the positive voltage VPOS, and a negative voltage circuit 18 according to the present disclosure.

FIG. 10 merely illustrates an example to which the negative voltage circuit 18 is applied, but is not limited thereto.

As described above, according to an example, a relatively high current may be supplied in an initial start-up mode, and a relatively lower current may be supplied in a normal operating mode than in the start-up mode by using different charge pumping abilities to each other. Thus, a rapid start-up may be implemented, and power consumption may be reduced in the normal operating mode. As a result, the time of the start-up mode may be reduced to reach the normal operating mode more rapidly.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A negative voltage circuit, comprising:
   a first charge pump circuit configured to operate in a start-up mode and perform a first charge pumping operation based on a first current to generate a negative voltage;
   a second charge pump circuit configured to operate in a normal operating mode subsequent to the start-up mode and perform a second charge pumping operation based on a second current to generate a negative voltage;
   a power switch circuit configured to selectively connect one of a first power terminal and a second power terminal, and a terminal of a first power supply voltage to each other; and
   a signal switch circuit configured to selectively connect one of a first signal terminal, connected to the first charge pump circuit, and a second signal terminal, connected to the second charge pump circuit, and a driving signal terminal to each other,
   wherein the first current is higher than the second current, and a speed of the first charge pumping operation is higher than a speed of the second charge pumping operation, and
   the first power terminal is connected to the first charge pump circuit and the second power terminal is connected to the second charge pump circuit.

2. The negative voltage circuit of claim 1, wherein the first charge pump circuit comprises:
   a first inverter circuit configured to perform a first charging operation and a first discharging operation based on the first current in response to a driving signal input through the signal switch circuit;
   a first output switch circuit configured to selectively connect a first capacitor node of the first inverter circuit to one of a second operating voltage terminal and a first output node of the first charge pump circuit in response to the driving signal input; and
   a first output capacitor connected between a first output node of the first charge pump circuit and a ground to stabilize a negative voltage at the first output node of the first charge pump circuit.

3. The negative voltage circuit of claim 2, wherein the second charge pump circuit comprises:
   a second inverter circuit configured to perform a second charging operation and a second discharging operation based on the second current in response to a driving signal input through the signal switch circuit;
   a second output switch circuit configured to selectively connect a second capacitor node of the second inverter circuit to one of a second operating voltage terminal and a second output node of the second charge pump circuit in response to the driving signal; and
   a second output capacitor circuit connected between a second output node of the second charge pump circuit and a ground to stabilize a negative voltage at the second output node of the second charge pump circuit.

4. The negative voltage circuit of claim 3, wherein the first inverter circuit comprises:
   a first upper switch element connected between a first power terminal and a first middle node of the power switch circuit and configured to perform a switching operation in response to the driving signal;
   a first lower switch element connected between the first middle node and a terminal of a second power supply voltage and configured to perform a switching operation complementary to the first upper switch element in response to the driving signal; and
   a first charge capacitor connected between the first middle node and the first capacitor node and configured to perform the first charging operation upon the first upper switch element being in an ON state and perform the first discharging operation upon the first lower switch element being in an ON state,
   the second inverter circuit comprises:
   a second upper switch circuit connected between a second power terminal of the power switch circuit and a second middle node and configured to perform a switching operation in response to the driving signal;
   a second lower switch element connected between the second middle node and a terminal of a second power supply voltage and configured to perform a switching operation complementary to the second upper switch element in response to the driving signal; and
   a second charge capacitor connected between the second middle node and a second capacitor node and configured to perform the second charging operation upon the second upper switch element being in an ON state and perform the second discharging operation upon the second lower switch element being in an ON state,
   the first upper switch element has a size larger than a size of the second upper switch element, and
   the first lower switch element has a size larger than a size of the second lower switch element.

5. The negative voltage circuit of claim 4, wherein the first output switch circuit comprises:
   a first ground switch connected between the first capacitor node and a terminal of the second operating voltage to enter an ON state during the first charging operation; and
   a first output switch connected between the first capacitor node and the output node to enter an ON state during the first discharging operation, and
   the second output switch circuit comprises:
   a second ground switch connected between the second capacitor node and the terminal of the second operating voltage to enter an ON state during the second discharging operation; and
   a second output switch connected between the second capacitor node and the output node to enter an ON state during the second discharging operation.

6. The negative voltage circuit of claim 5, wherein the first output capacitor circuit comprises:
   a first load capacitor connected between the first output node and a ground to stabilize a negative voltage at the first output node, and
   the second output capacitor circuit includes a second load capacitor connected between the second output node and a ground to stabilize a negative voltage at the second output node.

7. The negative voltage circuit of claim 6, wherein each of the first and second upper switch elements and the first and second ground switches is a PMOS transistor, and
   each of the first and second lower switch elements and the first and second output switches is an NMOS transistor.

8. A negative voltage circuit, comprising:
a first charge pump circuit configured to operate in a start-up mode and perform a first charge pumping operation based on a first current to generate a negative voltage;
a second charge pump circuit configured to operate in a normal operating mode subsequent to the start-up mode and perform a second charge pumping operation based on a second current to generate a negative voltage;
an operating mode control circuit configured to control switching from the start-up mode, in which the first charge pump circuit operates, to the normal operating mode, in which the second charge pump circuit operates, based on a negative voltage at an output terminal; and
a power switch circuit configured to selectively connect one of a first power terminal and a second power terminal, and a terminal of the first power supply voltage to each other under control of the operating mode control circuit,
wherein the first current is higher than the second current, and a speed of the first charge pumping operation is higher than a speed of the second charge pumping operation.

9. The negative voltage circuit of claim 8, further comprising:
a signal switch circuit configured to selectively connect one of a first signal terminal, connected to the first charge pump circuit, and a second signal terminal, connected to the second charge pump circuit, and a driving signal terminal to each other under control of the operating mode control circuit; and
an output circuit configured to transfer a negative voltage from the first charge to an output terminal and to transfer a negative voltage from the second charge pump circuit to an output terminal,
wherein the first power terminal is connected to the first charge pump circuit and the second power terminal is connected to the second charge pump circuit.

10. The negative voltage circuit of claim 9, wherein the first charge pump circuit comprises:
a first inverter circuit configured to perform a first charging operation and a first discharging operation based on the first current in response to a driving signal input through the signal switch circuit;
a first output switch circuit configured to selectively connect a first capacitor node of the first inverter circuit to one of a second operating voltage terminal and a first output node of the first charge pump circuit; and
a first output capacitor connected between a first output node of the first charge pump circuit and a ground to stabilize a negative voltage at the first output node of the first charge pump circuit.

11. The negative voltage circuit of claim 10, wherein the second charge pump circuit comprises:
a second inverter circuit configured to perform a second charging operation and a second discharging operation based on the second current in response to a driving signal input through the signal switch circuit;
a second output switch circuit configured to selectively connect a second capacitor node of the second inverter circuit to one of a second operating voltage terminal and a second output node of the second charge pump circuit in response to the driving signal; and
a second output capacitor circuit connected between a second output node of the second charge pump circuit and a ground to stabilize a negative voltage at the second output node of the second charge pump circuit.

12. The negative voltage circuit of claim 11, wherein the first inverter circuit comprises:
a first upper switch element connected between a first power terminal and a first middle node of the power switch circuit and configured to perform a switching operation in response to the driving signal;
a first lower switch element connected between the first middle node and a terminal of a second power supply voltage and configured to perform a switching operation complementary to the first upper switch element in response to the driving signal; and
a first charge capacitor connected between the first middle node and the first capacitor node and configured to perform the first charging operation upon the first upper switch element is in an ON state and perform the first discharging operation upon the first lower switch element is in an ON state,
the second inverter circuit comprises:
a second upper switch circuit connected between a second power terminal of the power switch circuit and a second middle node and configured to perform a switching operation in response to the driving signal;
a second lower switch element connected between the second middle node and a terminal of a second power supply voltage and configured to perform a switching operation complementary to the second upper switch element in response to the driving signal; and
a second charge capacitor connected between the second middle node and a second capacitor node and configured to perform the second charging operation upon the second upper switch element being in an ON state and perform the second discharging operation upon the second lower switch element being in an ON state,
the first upper switch element has a size larger than a size of the second upper switch element, and
the first lower switch element has a size larger than a size of the second lower switch element.

13. The negative voltage circuit of claim 12, wherein the first output switch circuit comprises:
a first ground switch connected between the first capacitor node and a terminal of the second operating voltage to enter an ON state during the first charging operation; and
a first output switch connected between the first capacitor node and the output node to enter an ON state during the first discharging operation, and
the second output switch circuit comprises:
a second ground switch connected between the second capacitor node and the terminal of the second operating voltage to enter an ON state during the second discharging operation; and
a second output switch connected between the second capacitor node and the output node to enter an ON state during the second discharging operation.

14. The negative voltage circuit of claim 13, wherein the first output switch circuit comprises:
a first ground switch connected between the first capacitor node and a terminal of the second operating voltage to enter an ON state during the first charging operation; and a first output switch connected between the first capacitor node and the output node to enter an ON state during the first discharging operation, and the second output switch circuit comprises:
a second ground switch connected between the second capacitor node and the terminal of the second operating voltage to enter an ON state during the second discharging operation; and
a second output switch connected between the second capacitor node and the output node to enter an ON state during the second discharging operation.

15. The negative voltage circuit of claim 14, wherein the operating mode control circuit comprises:
a comparison circuit configured to generate a control signal for controlling switching from the start-up mode to the normal operating mode,
wherein the control signal transitions from a low level to a high level upon the negative voltage being higher than or equal to the first reference voltage, and transitions from a high level to a low level upon the negative voltage being lower than or equal to a second reference voltage.

16. A negative voltage circuit, comprising:
a first charge pump circuit operating in a start-up mode to perform a first charge pumping operation based on a first current to generate a negative voltage to an output circuit;
a second charge pump circuit operating in a normal operating mode subsequent to the start-up mode to perform a second charge pumping operation based on a second current to generate a negative voltage to the output circuit;
a power switch circuit configured to selectively connect one of a first power terminal and a second power terminal, and a terminal of a first power supply voltage to each other; and
a signal switch circuit selectively connecting one of the first charge pump circuit and the second charge pump circuit, wherein the first current is higher than the second current, and a speed of the first charge pumping operation is higher than a speed of the second charge pumping operation, and the first power terminal is connected to the first charge pump circuit and the second power terminal is connected to the second charge pump circuit.

17. The negative voltage circuit of claim 16, wherein the first charge pump circuit comprises:
a first inverter circuit configured to perform a first charging operation and a first discharging operation based on the first current in response to a driving signal input through the signal switch circuit;
a first output switch circuit configured to selectively connect a first capacitor node of the first inverter circuit to one of a second operating voltage terminal and a first output node of the first charge pump circuit in response to the driving signal input; and
a first output capacitor connected between a first output node of the first charge pump circuit and a ground to stabilize a negative voltage at the first output node of the first charge pump circuit.

18. The negative voltage circuit of claim 17, wherein the second charge pump circuit comprises:
a second inverter circuit configured to perform a second charging operation and a second discharging operation based on the second current in response to a driving signal input through the signal switch circuit;
a second output switch circuit configured to selectively connect a second capacitor node of the second inverter circuit to one of a second operating voltage terminal and a second output node of the second charge pump circuit in response to the driving signal; and
a second output capacitor circuit connected between a second output node of the second charge pump circuit and a ground to stabilize a negative voltage at the second output node of the second charge pump circuit.

* * * * *